United States Patent [19]

Faccini et al.

[11] 4,371,771
[45] Feb. 1, 1983

[54] CUTTING TORCH AND METHOD

[75] Inventors: Ernest C. Faccini, Marbury, Md.; Thomas E. Wergen, Granby, Conn.

[73] Assignee: The United States of America as represented by the Secretary of the Navy, Washington, D.C.

[21] Appl. No.: 205,540

[22] Filed: Nov. 10, 1980

[51] Int. Cl.³ .............................................. B23K 9/00
[52] U.S. Cl. .................... 219/70; 219/60 R; 431/255
[58] Field of Search .............. 219/70, 146.1, 74, 69 R; 431/255; 361/260

[56] References Cited
U.S. PATENT DOCUMENTS

| | | | |
|---|---|---|---|
| 1,037,979 | 9/1912 | Perkins | 219/70 X |
| 2,398,427 | 4/1946 | Hediger | 219/15 |
| 2,802,930 | 8/1957 | Ronay | 219/70 |
| 3,646,306 | 2/1972 | Olds | 219/70 |
| 4,069,407 | 1/1978 | Brower | 219/70 |
| 4,182,947 | 1/1980 | Brower | 219/70 |
| 4,201,902 | 5/1980 | Riepper | 219/70 |

OTHER PUBLICATIONS

Cary, "Modern Welding Technology", Prentice Hall, Englewood Cliffs, N.J., p. 247, (1979).

Primary Examiner—Elliot A. Goldberg

[57] ABSTRACT

A cutting torch and method for cutting or removing a material in which a high-velocity reactive gas stream is used to promote combustion of the material whereby a hollow elongated structure with an adequate supply of aluminum for producing unstable aluminum oxides are utilized.

12 Claims, 5 Drawing Figures

CUTTING TORCH AND METHOD

BACKGROUND OF THE INVENTION

The invention pertains generally to tools and particularly to a thermic device and technique for cutting or removing an oxidizable material.

Many thermic techniques and devices rely on oxidation at elevated temperatures to cut or remove metals from a work piece. An early technique utilizes an oxyacetylene flame to locally preheat a spot on a metal surface to incandescence and a jet stream of a gas mixture of acetylene and mostly oxygen to oxidize and remove the oxide products of the combustion. Although this technique is moderately fast and efficient, it has several disadvantages arising from its requirement of large amounts of acetylene and oxygen gas which have to be supplied under high pressure and heavy metal containers. The containers consitute a serious hazard, particularly, in areas which are subject to bombardment or fire because an explosion or fire may cause them to explode with great force, scattering metal fragments for long distances. Another disadvantage is that the flame is not hot enough for many applications.

An alternative to the oxyacetylene technique which avoids its disadvantages is referred to as the arc-oxygen technique in which an electrode and the metal work piece are connected to a power source, a small area on the metal surface is heated by an electrical arc formed between the electrode and the metal work piece, and a jet stream of essentially oxygen oxidizes and removes the oxidation products from the work piece. Usually the oxygen is delivered and directed by a metal tubing which also serves as the electrode. Since the electric arc heats both the electrode and part of the work piece, the electrode is consumed and therefore the delivery tube of the arc oxygen cutter must constantly be replaced.

In order to improve the life of the tube the composition of the electrodes has been varied considerably. For example, U.S. Pat. No. 2,398,427 by Ernst Hediger, issued on Apr. 16, 1946 discloses a tube comprising a nonmetallic refractory metal with a sleeve made from metal with a high melting point, for example aluminum, nickel, brass or iron, and U.S. Pat. No. 2,802,930 by Bela M. Ronay, issued on Aug. 13, 1957, discloses an electrode fabricated from a material comprising cast iron, aluminum and silicon. A recent innovation, disclosed in U.S. Pat. No. 3,646,306 by Edwin W. Olds issued on Feb. 29, 1972, utilizes a thin wall tube with a wire-like structure at the center of the tube which becomes the electrode instead of the tube. The wire-like structure comprises carbon or graphite in a polymeric binder; so that, the electrode is flexible and can be continuously fed to the tip of the cutting torch. Aluminum or magnesium can be added to increase the temperature of the arc over that produced by the pure carbon or graphite electrode.

Other problems associated with thermic techniques or devices utilizing oxidation are temperatures that are too low for some applications and the requirement that an arc must always be present for the successful operation of the technique or device. The devices and methods, shown in U.S. Pat. Nos. 4,069,407 and 4,182,947 by Jerome S. Brower issued on Jan. 17, 1978 and Jan. 8, 1980 utilize the thermite reaction consisting of 8 moles of aluminum plus three moles of iron oxide to produce 4 moles of aluminum oxide plus nine moles of molten iron. The reaction is extremely exothermic, releasing 758,000 calories per gram molecular weight. This reaction is produced by passing a high-velocity stream of oxygen past steel rods and rods made from aluminum, magnesium, titanium, or alloys thereof located in a steel tube. While this approach produces high temperatures and a self-sustaining burn which allows cutting or removing nonconductive materials the problem of the tube being consumed remains unsolved.

Although the temperature produced in the Brower patents is extremely high, it should be higher for some applications. For example munition demilitarization requires the cutting to be faster than the heat transferred through the metal casing; so that, the propellant or explosive is combusted in a container opened to the atmosphere rather than in a closed container. Thus the cutting speed determines, to a large degree, the safety.

SUMMARY OF THE INVENTION

It is, therefore, an object of the present invention to provide a simple and light cutting torch.

Another object of the present invention is to increase the temperature of the cutting flame over those presently obtained with arc oxygen cutting torches.

A further object is to cut extremely thick pieces of oxidiable material quickly.

A still further object of the present invention is to provide a nonconsumable cutting torch.

These and other objectives are achieved by the exothermic reaction of a reactive gas with a workpiece. The reaction is initiated and catalyzed by numerous microsites of extreme heat produced by the reaction of unstable oxides of aluminum, the reactive gas and the workpiece.

BRIEF DESCRIPTION OF THE DRAWINGS

The invention is more readily understood by reference to the following drawings in which.

DETAILED DESCRIPTION OF THE INVENTION

Figure 1:
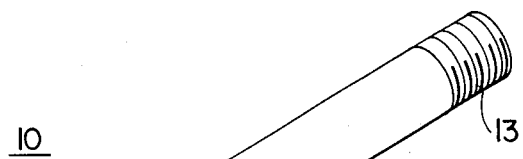
FIG. 1 is a perspective view, partly broken away, of a cutting torch barrel according to a preferred embodiment of the invention.

Referring to FIG. 1, a preferred embodiment of a cutting torch barrel 10 of the present invention is shown, wherein shell 11 has a threaded end 13 for attaching the torch to a holder, not shown in FIG. 1. The shell is fabricated preferably from aluminum, but can be prepared from magnesium or titanium alloys of aluminum having at least 75 weight percent of aluminum.

Since the basis of the invention is the production of a small amount of unstable aluminum oxides in a high-velocity stream of oxygen, the surface area of the aluminum is critical to the operation of the present cutting torch. It has been determined that a surface area of at least about 80 sq. cm is required for a flow rate of about $1.4 \times 10^4$ cc/min and preferably the surface area is at least 100 sq. cm for that flow rate. This requirement can be expressed as at least $5.7 \times 10^{-3}$ cm²/cc/min and the preferred embodiment as at least $7 \times 10^{-3}$ cm²/cc/min. Thus the minimum and preferred surface areas for higher flows can be easily calculated.

The dimensions of shell 11 do not greatly affect the performance of the cutting torch; so long as, the necessary surface area is obtained. However, the L/D should not be less than 9:1 and preferable the L/D is from 10:1 to 20:1. For most applications and especially for ordnance demilitarization, the I.D. should not be less than 1.2 cm and preferably from about 1.6 cm to about 2.3 cm. Oxygen consumption would limit the I.D. to about 3.7 cm for almost all applications. If it is necessary to produce a larger hole, then a large tube with a rod in the middle should be utilized. The minimum length for the aluminum tube is at least about 10 cm, but the preferred length is from 15 to 25 cm.

The cutting action on the workpiece is initiated by raising the temperature of a small area to at least about 370 C. and preferably to at least 500 C. This temperature can be reached by igniting a kitchen match on the surface of the workpiece. Other techniques are establishing an electric arc between the cutting torch barrel and the workpiece or using an electric match.

Figure 2:
FIG. 2 is a longitudinal sectional view of a cutting torch barrel according to an embodiment of the present invention.

FIG. 2 illustrates a preferred embodiment which can establish an electric arc with a workpiece. An electrically conductive rod 15 is attached to shell 11 and is electrically connected to one side of an electrical power source. The other side of the power source is connected to the workpiece 17. Rod 15 is kept at a distance from the workpiece sufficient to establish an electric arc. The electric arc melts a small quantity of metal which is impinged by a high-velocity stream of oxygen exiting from the shell 11. Once cutting begins the electric arc is no longer needed and can be eliminated.

Figure 3:
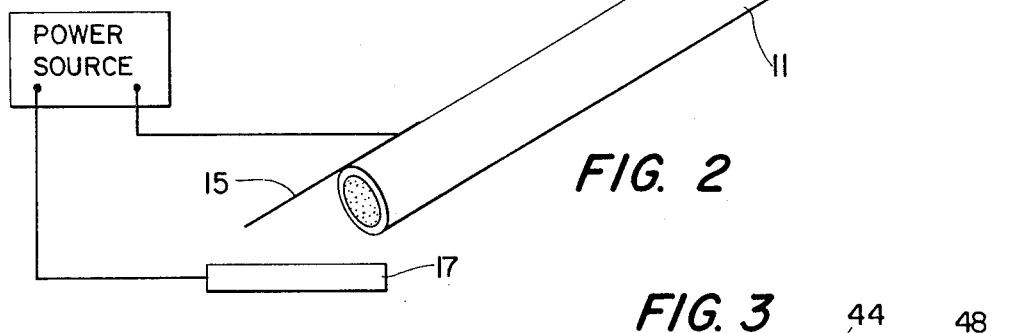
FIG. 3 is a longitudinal sectional view of the subject cutting torch barrel and an electric match.

For munition demilitarization the preferred initiator is an electric match, shown in FIG. 3. An electric match permits a remote activation, e.g., 750 meters away, and it is inexpensive. Referring to FIG. 3, the electric match 42 is held in place by a plastic (e.g., nylon or acrylic) cap 44. Attached to the match are electrical leads 46 which are attached to a power source not shown. The cap 44 is connected to the torch barrel 10 by sliding it on the end of the barrel. Holes 48 permit oxygen to escape, so that, the oxygen flow can be established before igniting the match.

Figure 4:
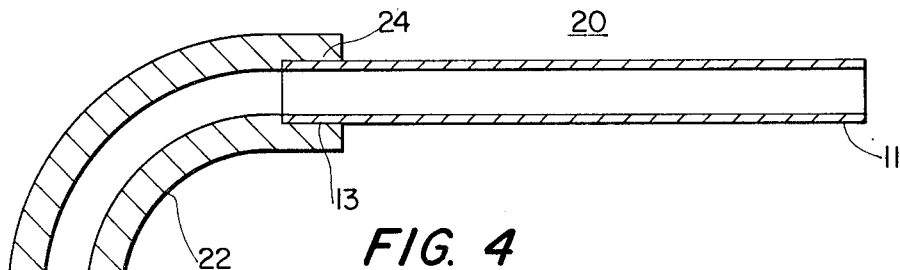
FIG. 4 is a longitudinal sectional view of the cutting torch barrel of FIG. 1 attached to a barrel holder to form a cutting torch of the present invention.

FIG. 4 illustrates a cutting torch 20 utilizing the preferred cutting-torch barrel of FIG. 1. The barrel is attached to a holder 22 at the threaded end 24. Oxygen or an oxygen-containing gas flows from a supply, not shown, through conduit 26 and valve 28 to cutting torch barrel 11 so that, the oxygen flow can be established before igniting the match.

The oxygen should be supplied to the cutting-torch barrel at a pressure at least sufficient to remove molecules of aluminum from the shell in a quantity needed to promote the combustion of an area on a workpiece. It has been determined that the minimum pressure is about 5 atm. At this pressure, the volumetric flow is about $1 \times 10^4$ cc/min for any with an I.D. of at least 0.75 cm. The maximum pressure is determined by the physical strength of the equipment and at times by the sensitivity of the workpiece to pressure, e.g., ordnance. For most applications pressures, from about 6.5 to about 14 atm., are preferred, representing the best compromise between effectiveness and cost.

The cutting torch should be at most about 2.2 mm from the workpiece in order for a reaction to occur on the workpiece surface. The preferred distance is from 1.4 to 1.8 mm. This distance provides excellent reliability and gas removal and good protection of the barrel. The cutting torch should be held 90°±10° to the cutting surface and preferably 90° to the cutting surface.

Figure 5:
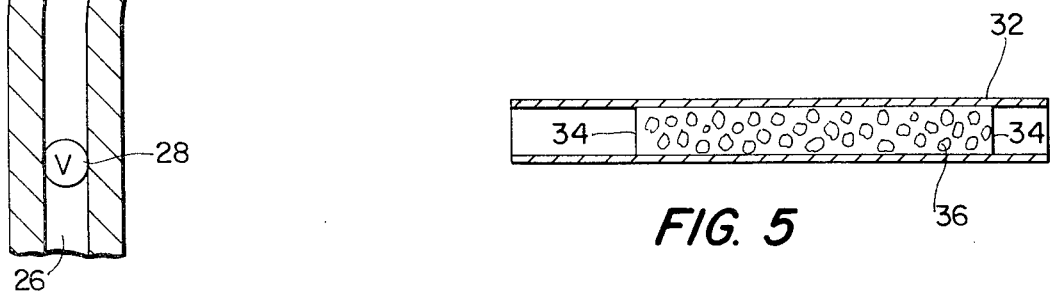
FIG. 5 is a perspective view of a cutting torch barrel according to a preferred embodiment of the invention.

If an adequate source of aluminum is provided, the shell can be fabricated from a material other than aluminum, e.g., ceramic. FIG. 5 illustrates a preferred embodiment, wherein, shell 31 is not aluminum. Inside shell 31, porous dividers 33 define a cavity in which aluminum 35 as a powder, ribbon, particles, etc., is placed. The size of the cavity, the physical form and amount of aluminum is not critical, so long, as the minimum aluminum surface area is achieved and excessive flow resistance is avoided.

One of the most demanding and dangerous uses of cutting torches is demilitarizing ordnance by case penetration. This method can be described as the application of an external heat source, e.g., a cutting torch, upon a composite structure consisting of an outer high-strength, case-material layer, e.g., steel, an intermediate bonding agent, e.g., rubber, and an inner explosive material, e.g., Explosive D. Under continued application of the thermal heating source, the temperature of the composite rises with time. If the casing is not breached before the explosive reaches its reaction temperature, a detonation can occur. A rapid break is best assured by exposing the casing to a high temperature along with developing an exothermic reaction on the surface.

The cutting torch of this invention accomplishes a rapid breach with the high temperatures produced by a high-velocity stream of oxygen impinging upon a spot on the surface which initially has a temperature of at least 375 C. and which has numerous microsites of intense heat caused by the reactions of unstable aluminum oxides with iron and/or other reactable ingredients in the ordnance casing.

In order to demonstrate the practice and effectiveness of the present invention the following examples are given. It is understood that these examples are given by way of illustration and are not intended to limit the specification or the claims to follow in any manner.

EXPERIMENTAL SECTION I

Two cutting torches were compared in cutting Explosive D projectiles which have a shell with a 1.3 cm thickness. One torch had an aluminum tube with an I.D. of 1.6 cm (⅝ in.) and a length of about 20 cm (8 in.) for the barrel shell and the other had a mild steel tube with the same dimensions for its barrel shell. Both torches had about 10 atm. of oxygen pressure and were held about 1.8 mm from the steel plate at an angle of about 90° to the plate. An electric match was used to initiate the cutting.

The aluminum-tube series comprised 18 separate tests, of these 16 tests had been successful. The two failures were due to ignition problems with the electric match. No test experienced a detonation of the explosive. The torch with the aluminum shell produced holes of 54.44 sq. cm. with a standard deviation of 9.03.

The steel-tube series comprised 25 tests and had an average hole size of 20.71 sq. cm., with a standard deviation of 8.51. The series has 10 completely successful tests, 9 tests in which there was some burn-through of the steel casing but not enough to burn the explosive, and 6 tests in which the steel casings was not breached because the steel barrel did begin to react.

Although no detonation occurred, a serious threat existed with the 9 tests which had a partial burn-through, as subsequent tests have shown with their detonations. The 6 tests, in which the steel barrel did not begin to react with the oxygen, presented no possibility of detonation because the munition was not exposed to high temperatures. Any misfire or unreliability is completely unacceptable. The other 10 tests, although successful, still had the disadvantage of completely consuming the steel barrel.

EXPERIMENTAL SECTION II

The above test for the aluminum tube cutting torch was repeated except that the torch was placed at an angle to the surface of the Explosive D projectile. The angles for the first test was 45°, 60° and about 70°. In all three tests, the cutting torch failed to burn through the projectile.

Obviously many modifications and variations of the present invention are possible in light of the above teachings. It is therefore to be understood that within the scope of the appended claims the invention may be practiced otherwise than as specifically described.

What is claimed is:

1. In a cutting torch in which a high-velocity flow of a reactive gas is used to promote combustion of a material and thereby removing a portion of said material, the improvement which comprises a barrel comprising an elongated hollow shell; and a single metal selected from the group consisting of aluminum and an aluminum alloy having at least 75 weight percent aluminum contained within said barrel, said aluminum or aluminum alloy having a surface area of at least about 80 sq. cm.

2. The torch of claim 1 wherein said barrel consists of said shell which consists essentially of aluminum or an aluminum alloy having at least about 75 weight percent aluminum, said shell having an interior surface area, of at least about 80 sq. cm.

3. The torch of claim 2 wherein said shell is an aluminum tube with a surface area of at least about 80 sq. cm and a L/D ratio of at least about 9:1.

4. The torch of claim 2 wherein said shell is an aluminum tube with a surface area at least 100 sq. cm and a L/D ratio from 10:1 to 20:1.

5. In a method for cutting or removing a metal which comprises raising the temperature of a portion of the surface of said metal to at least about 370° C. and impinging upon said portion a high-velocity stream of a reactive gas from a cutting torch wherein said high-velocity flow of a reactive gas promotes combustion of said metal, thereby removing a portion of said metal, the improvement which comprises selecting for said cutting torch a cutting torch which comprises a barrel comprising an elongated hollow shell and a single reactant metal selected from the group consisting of aluminum and an aluminum alloy having at least about 75 weight percent aluminum contained within said barrel, said reactant metal having a surface area of at least 80 sq. cm.

6. The method of claim 5 wherein the temperature of said portion is raised to at least 500° C.

7. The method for cutting or removing metal of claim 5 wherein said barrel of said torch comprises an aluminum tube with a L/D ratio of at least about 9:1.

8. The method of claim 7 wherein the temperature of said portion is raised to at least 500° C.

9. The method for cutting or removing metal of claim 7 wherein said aluminum tube has a surface area of at least about 100 sq. cm and a L/D ratio from 10:1 to 20:1.

10. The method of claim 9 wherein the temperature of said portion is raised to at least 500° C.

11. The method of claim 5 wherein the rate of volumetric flow of said high-velocity stream is such that the surface area per rate of volumetric flow is at least $5.7 \times 10^{-3}$ cm$^2$/cc/min.

12. The method of claim 11 wherein the rate of volumetric flow of said high-velocity stream is such that the surface area per rate of volumetric flow is at least $7 \times 10^{-3}$ cm$^2$/cc/min and said temperature is at least 500° C.

* * * * *